United States Patent [19]

Cameron

[11] 4,279,105
[45] Jul. 21, 1981

[54] GROUND-BASED PORTABLE AND COLLAPSIBLE STRUCTURES

[76] Inventor: John S. Cameron, 28 Cockels Loan, Renfrew, Scotland

[21] Appl. No.: 43,372

[22] Filed: May 29, 1979

[30] Foreign Application Priority Data

Jun. 6, 1978 [GB] United Kingdom ............... 26384/78

[51] Int. Cl.³ ...................... E04B 1/346; E01F 13/00
[52] U.S. Cl. ........................................... 52/71; 40/606;
40/610; 116/63 T; 404/6; 404/10
[58] Field of Search ................... 52/64, 66, 69, 70, 71;
404/6, 10; 40/606, 610, 612, 124.1, 152.1, 598,
903; 116/63 P, 63 T

[56] References Cited

U.S. PATENT DOCUMENTS

| | | | |
|---|---|---|---|
| 2,112,583 | 3/1938 | Tucker | 40/152.1 |
| 2,961,786 | 11/1960 | Lowmaster | 40/606 |
| 3,231,994 | 2/1966 | Cyrus | 116/63 P |
| 3,625,177 | 12/1971 | Miller | 40/903 |
| 4,011,682 | 3/1977 | Ach | 52/71 |

FOREIGN PATENT DOCUMENTS

| | | | |
|---|---|---|---|
| 495840 | 9/1950 | Belgium | 116/63 P |
| 588328 | 12/1959 | Canada | 40/606 |
| 907121 | 3/1954 | Fed. Rep. of Germany | 52/633 |
| 1108430 | 1/1956 | France | 52/633 |
| 1287433 | 2/1962 | France | 40/606 |
| 622273 | 6/1961 | Italy | 116/63 P |
| 1167085 | 1/1967 | United Kingdom | 116/63 P |
| 1067154 | 5/1967 | United Kingdom | 116/63 P |
| 1112672 | 5/1968 | United Kingdom | 116/63 P |
| 2027247 | 2/1980 | United Kingdom | 40/610 |

*Primary Examiner*—Price C. Faw, Jr.
*Assistant Examiner*—Henry E. Raduazo
*Attorney, Agent, or Firm*—Gerald J. Ferguson, Jr.; Joseph J. Baker

[57] ABSTRACT

A ground-based portable and collapsible structure comprises two similar rectangular plates hinged together and disposed in downwardly-diverging relationship with their hinge-remote edges engaging the bottoms of re-entrant slots opening from the upper edges of spaced and parallel bar means of inverted T-section disposed on the ground transverse to said plate edges. Each bar means may be an inverted T-section bar or two L-section bars secured to one another with their vertical webs mutually opposite and spaced, preferably by spindles on which spiked metal strips are mounted for pivotal movement between a first position wherein it is accommodated in said gap and a second position wherein it projects downwardly from the L-section bars, the two strips being offset one to each side of the median plane bisecting said gap and being maintained in such dispositions by spacers mounted on the spindles alongside the strips.

7 Claims, 5 Drawing Figures

U.S. Patent    Jul. 21, 1981    Sheet 2 of 2    4,279,105
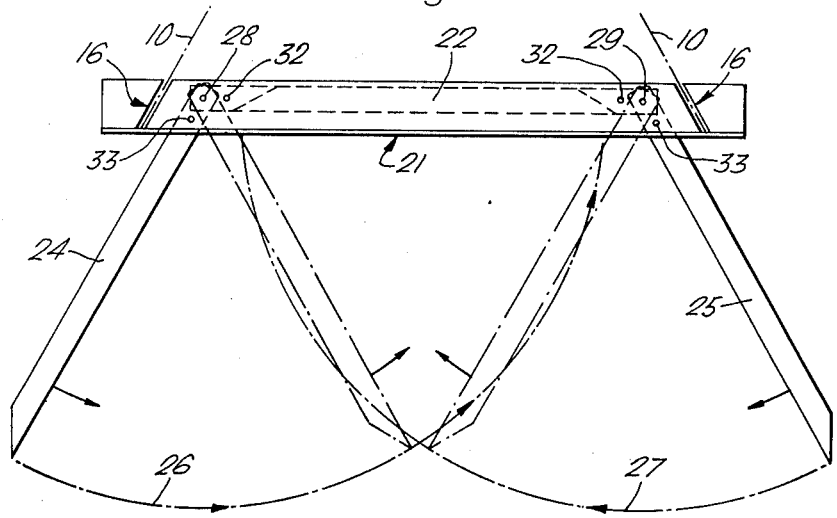
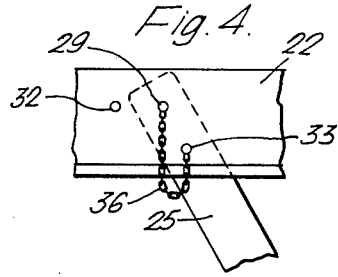
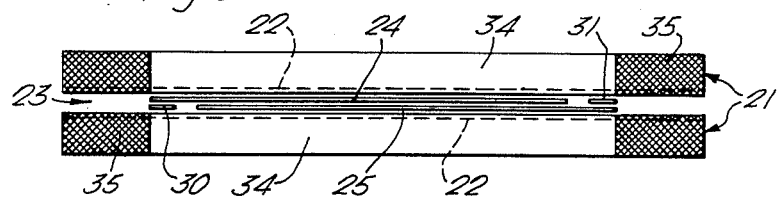

GROUND-BASED PORTABLE AND COLLAPSIBLE STRUCTURES

This invention relates to ground-based portable and collapsible structures such as road signs, trestles and shelters.

A serious problem encountered in the use of such structures, especially, as is more often than not the case, when such use is in wide-open situations, is their lack of stability in windy conditions. Indeed it has frequently been necessary hitherto in the use of portable road signs on motorways, to counter any tendency to displacement of the road signs by strategic location of deadweight obstacles such as sandbags and railway sleepers.

The primary objection of the present invention is to overcome the aforesaid problem.

In accordance with the present invention, I provide a ground-based portable and collapsible structure comprising two similar rectangular plates hinged together and disposed in downwardly-diverging relationship with their hinge-remote edges engaging the bottoms of re-entrant slots opening from the upper edges of spaced and parallel bar means of inverted T-section disposed on the ground transverse to said plate edges.

Elastomeric material may be adhered to the undersurfaces of said bar means especially when the structure is a road sign.

Also, in accordance with the present invention, I provide a set of components for the erection of a ground-based portable and collapsible structure made up of two similar rectangular sheets hinged together through reflex hinges to provide bilateral symmetry in any relative positions of the plates and a plurality of similar T-section bar means to be disposed in spaced and parallel relationship on the ground with the double-flange forming strips lowermost and with precise registry in two upwardly-convergent planes of corresponding individual slots of two widely-spaced re-entrant slots of width tailored to the thickness of the plates and opening from the free edge of each stem-forming strip of each bar means to receive the hinge-remote edges of the plates when the latter define therebetween the appropriate acute angle.

An embodiment of the invention will now be described, by way of example, with reference to the accompanying drawings, in which:

FIG. 3 is a side elevation of an alternative bar means of inverted T-section;

FIG. 4 is a detail of FIG. 3, on a larger scale; and

FIG. 5 is an underneath plan view of the bar means of FIG. 3, with the spiked metal strips nested in the gap between the two L-section bars forming the bar means of inverted T-section.

Figure 1:
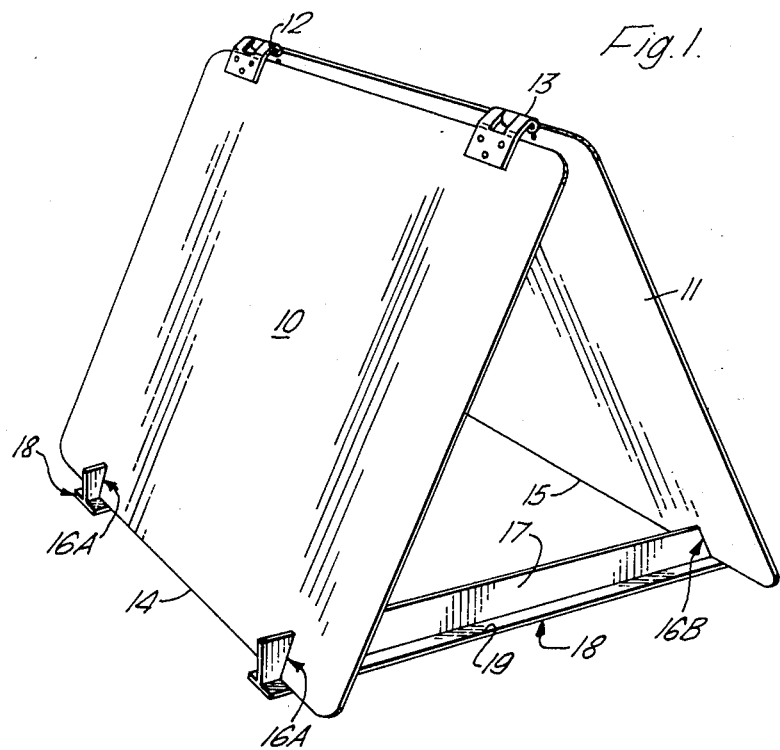
FIG. 1 is a perspective view of a portable and collapsible structure in accordance with the invention, intended, with appropriate legends thereon, for use as a road sign.

The structure shown in FIG. 1 comprises two similar rectangular plates 10 and 11 measuring 3 feet by 2 feet, for example, with rounded corners. Both surfaces of each plate have appropriate legends thereon giving warning of temporary hazards on roads. The two plates 10 and 11 are hinged together through reflex hinges 12 and 13 providing bilateral symmetry to the structure in any relative positions of the plates.

The plates are opened out from one another at an angle which is about 60° in the embodiment shown but which may be as much as about 75°, and the edges 14 and 15 of the plates remote from the hinges 12 and 13 are against the bottoms of two widely-spaced re-entrant slots 16A and 16B tailored to the thickness of the plates 10 and 11 and opening into stem-forming strips 17 of two spaced and parallel similar bars 18 of inverted T-section whereof the double-flange forming strips 19 rest on the ground. The bars 18 are transverse to the plates 10 and 11 and close to the ends of the latter to afford maximum stability to the structure in the direction along the plates. The corresponding slots 16A and 16B in the stem-forming strips of the two bars are at equal and opposite angles and are precisely aligned in the two upwardly-convergent planes occupied by the downwardly-divergent plates 10 and 11.

Pads 20 of elastomeric material, such as rubber, are provided on the undersurface of each bar 18 adjacent each end thereof. The pads 20 have tread surfaces as shown and effectively prevent slippage of the structure when set up on road surfaces and subjected to high winds.

Referring now to FIGS. 3 to 5, the alternative bar means of inverted T-section comprises two L-section bars 21 disposed with their vertical webs 22 opposite one another and in spaced and parallel relationships to define therebetween a gap 23 in which can be accommodated two spiked metal strips 24 and 25 mounted for pivotal movement between the nested position shown in FIG. 5 and the position shown in full lines in FIG. 3 as indicated by the interrupted arcs 26 and 27 in FIG. 3. The strips 24 and 25 are mounted for pivotal movement about spindles 28 and 29 fixedly secured between the vertical webs 22 and spacing the latter apart. The strips 24 and 25 are offset one to each side of the median vertical plane bisecting the gap 23 between the webs 22, and are maintained in such relative dispositions by spacers 30 and 31 mounted on the spindles 28 and 29 alongside the strips 24 and 25, respectively.

As can be seen in FIG. 4, the webs 22 have bores 32 and 33 therethrough at equal spacings from the spindle 29 (or 28), the axis of each bore being normal to the axis of the pertaining strip 25 (or 24) in a different one of the end positions of the strip. The strip 25 (or 24) has therethrough a bore which co-incides axially with the bore 32 or (33) in each of the end positions of the strip 25 (or 24) and a pin is inserted through the aligned bores in each such end position, the pin being held captive by a length of chain 36 secured to the outer surface of one of the webs.

Figure 2:
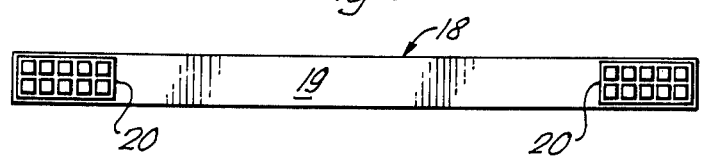
FIG. 2 is an underneath plan view of one of the bars of inverted T-section of the structure of FIG. 1.

As in the FIGS. 1 and 2 embodiment, the horizontal webs 34 are provided on the undersurface thereof adjacent each end thereof with pads 35 of elastomeric material and which have tread surfaces.

When the portable and collapsible structure of FIGS. 3 to 5 is set up on a road surface, the spiked metal strips 24 and 25 are locked in the nested position between the webs 22 as shown in FIG. 5, but when it is set up on soft ground, e.g. at the verge of a road, the strips are pivoted to their other end positions and locked prior to being forced into the ground.

The plates 10 and 11 may have strategically positioned holes to enable the application thereon by means of plugs of other plates marked with different legends.

I claim:

1. A ground-based portable and collapsible structure, e.g. a road sign, comprising two similar substantially rectangular plates hinged together and to be disposed in use in downwardly-diverging relationship with restricting means joining the two plates remote from the hinge axis to limit the angle to which the plates can open from one another, characterised in that the restricting means comprises a pair of bar means to be disposed in use on the ground in spaced and parallel relationship and affording respective pairs of upwardly-opening re-entrant slots which by alignment of the bar means may be brought into precise registry in two upwardly-converging planes intersecting at an angle of at least about 60° and at most about 75° and in which are engaged the hinge-remote edges of the plates.

2. A strusture as claimed in claim 1, wherein each bar means comprises a T-section bar with said slots being provided in the stem-forming web of the bar.

3. A structure as claimed in claim 1, wherein each bar means comprises two L-section bars secured to one another with their vertical webs mutually opposite and spaced.

4. A structure as claimed in claim 3, wherein the L-section bars are fixedly secured to one another by two spindles each bridging the gap between said vertical webs somewhat inwardly of a different one of said re-entrant slots.

5. A structure as claimed in claim 4, wherein a spiked metal strip is mounted on each spindle for pivotal movement between a first position wherein it is accommodated in said gap and a second position wherein it projects downwardly from the L-section bars, the two strips being offset one to each side of the median plane bisecting said gap and being maintained in such dispositions by spacers mounted on the spindle alongside the strips.

6. A structure as claimed in claim 5, including means for locking the spiked metal strips in both said first and second positions.

7. A structure as claimed in claim 1 or any one of claims 2 to 6, wherein elastomeric material is adhered to those surfaces of said bar means which in use are in contact with the ground.

* * * * *